March 12, 1929.  A. E. PHILLIPS  1,705,135
CIRCUIT CLOSER FOR SIGNAL DEVICES
Filed Aug. 2, 1926  2 Sheets-Sheet 1
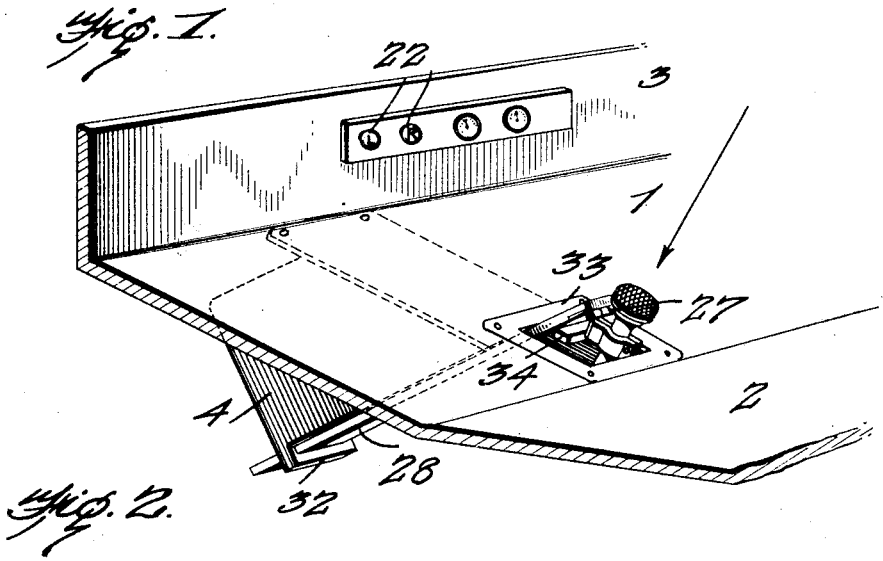
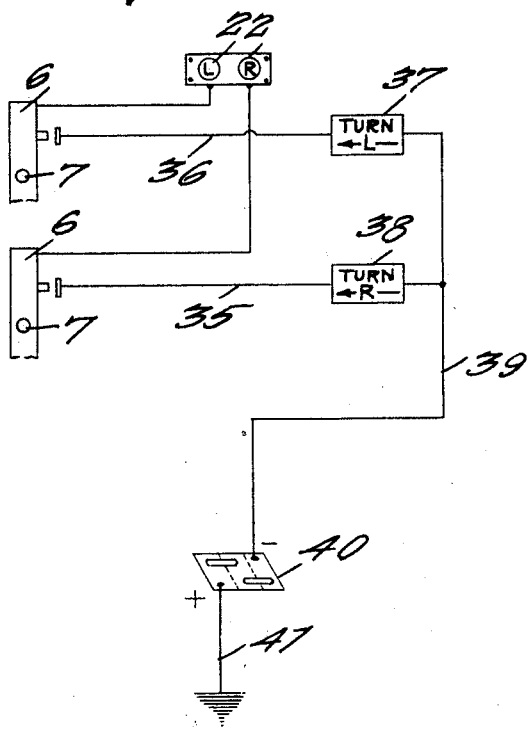
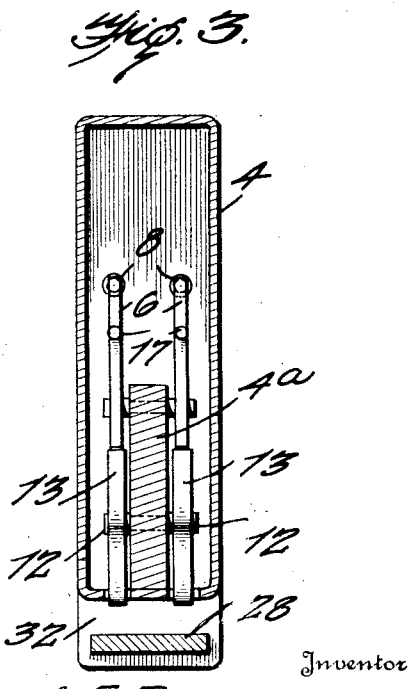
Inventor
A. E. Phillips,
By
Attorney March 12, 1929.  A. E. PHILLIPS  1,705,135
CIRCUIT CLOSER FOR SIGNAL DEVICES
Filed Aug. 2, 1926  2 Sheets-Sheet 2
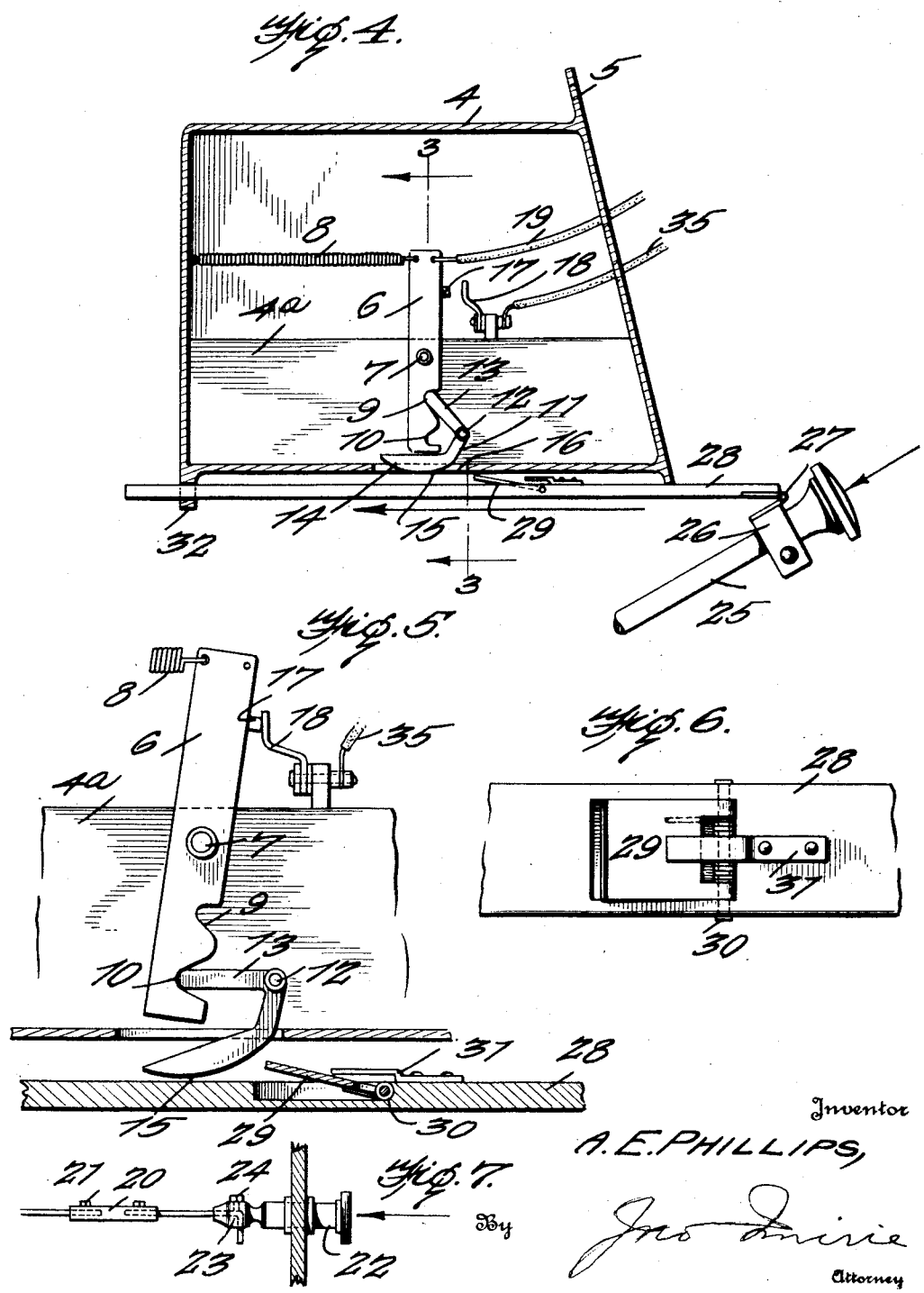
Inventor
A. E. PHILLIPS,
By
Attorney Patented Mar. 12, 1929.

1,705,135

UNITED STATES PATENT OFFICE.

ALFRED E. PHILLIPS, OF ZANESVILLE, OHIO.

CIRCUIT CLOSER FOR SIGNAL DEVICES.

Application filed August 2, 1926. Serial No. 126,559.

This invention relates to a signal operating means designed more particularly for use on moving vehicles, as automobiles or the like, and adapted to indicate to the following or advancing vehicle the intention of the driver to carry out a contemplated operation as turning, stopping, or the like.

The invention generally speaking, is intended to provide a compact structure which may be readily associated with any type of vehicle and which will permit the signal operating mechanism to be set to indicate a signal through a manual operation on the part of the driver, the release of the signal, that is the restoration of the parts to normal position, being automatically accomplished by the action of the driver in accelerating the motion of the vehicle through the usual accelerator pedal, as for example where the speed of the car is increased following the turn indicated by the signal.

The invention comprehends a casing in which are mounted switch elements adapted to be manually set to close a selected circuit and thereby energize a desired signal through the operation of a pull member preferably arranged on the dash of the vehicle, there being connected to the accelerator pedal a tripping member which, in the movement of such accelerator pedal to increase the speed of the vehicle, automatically operates the switches to deenergize the signal circuits and thereby restore the parts to normal positions.

The invention is illustrated in the accompanying drawings, in which:—

Fig. 1 is a broken perspective illustrating the application of the improvement.

Fig. 2 is a diagrammatic view showing the circuit.

Fig. 3 is a section on line 3—3 of Fig. 4.

Fig. 4 is a longitudinal section partly in section through the casing and combined switches.

Fig. 5 is a view in elevation partly in section showing one of the switches set to close the circuit.

Fig. 6 is a plan view of the tripping member.

Fig. 7 is a view in elevation partly in section showing the pull bars for operating the switches.

The invention is shown in connection with an automobile, certain parts of which it is necessary to refer to, such for example as the forward inclined section 1 of the floor-board 2, and the instrument board or dash 3.

The improved signal operating means comprises a rectangular casing which may be and preferably is entirely closed, and will of course have one wall removable, though such is not illustrated, in order to permit access to the interior parts. The casing has one wall formed with projecting flanges 5 whereby the casing may be secured beneath the inclined portion 1 of the floor-board of the vehicle. Extending longitudinally of the casing, and resting on the bottom wall thereof is a partition 4ª, on each of which is arranged a switch element 6 in the form of a bar pivoted at 7 and influenced in one direction through the medium of a spring 8 connected to the upper end of the bar and the adjacent end wall of the casing. As will be plain from Fig. 3 the switch bar 6 is supported on each side of the partition 4ª and extends above said partition. The forward edge of each switch bar below the pivot 7 is formed with two independent notches or recesses 9 and 10, the latter being preferably of greater depth than the former, and the edge of the bar between the recesses being rounded to permit a ready merging from one recess into the other.

Mounted on the partition 4ª in advance of each switch bar 6 is a locking member 11 comprising annularly related sections pivotally mounted at the inclined juncture as at 12 on the partition. One of the sections of the locking member as 13 is in the form of a bar, the free end of which is adapted to engage in either of the notches 9 or 10 according to the position of the switch bar. The other section of the locking member terminates in a foot 14 having a longitudinally rounded lower surface 15, the foot portion of the locking member overbalancing the section 13 so that the foot portion has a normal tendency to move through an opening 16 in the bottom of the casing 4. Each switch bar 6 carries a contact point 17 which in the operative position of the switch bar engages a terminal contact spring 18 supported on and insulated from a bracket projecting laterally from one of the side walls of the casing 4. Each switch bar is operated through a Bowden wire connection 19 leading to a pull bar 22 on the instrument board or dash 3 of the vehicle. The wire element of the connection is designed particularly with a view to taking up any slack that may develop, it being for this purpose divided adjacent the pull bar with its terminals engaged in a connector 20 and held by set screws 21, the terminal of the wire being passed through an opening 23 in the inner terminal of the pull rod with its end deflected through a lateral portion of such opening and secured by a set screw 24. By this means any slack in the wire connection may be readily taken up and compensated for in an obvious manner.

Obviously under the action of the pull rod 22 the upper end of the particular switch bar 6 is drawn forwardly against the influence of the spring permitting the free end of the section 13 of the locking member to ride out of the recess 8 and find its way into the recess 10 where it serves to lock the switch bar in a switch closing position, it being noted that in this position the contact terminals 17 and 18 are in engagement. In this position of the locking member the foot portion 14 of such member depends through the opening 16 in the bottom of the casing. With the signal set through the energization of the circuit, closed through the described operation of the switch member, it is desirable to automatically deenergize such circuit when the driver seeks to increase the speed of the machine after having carried out the operation indicated by the signal. Ordinarily the speed control is through the accelerator bar 25, and to provide for the release of the switch bars in and during the operation of the accelerator, a trip plate 28 is arranged for cooperation with the casing 4, and connected to the accelerator rod 25 through the medium of a clamping member 26 with the latter adapted to engage the accelerator rod and having hinged connection with the trip plate 28. This trip plate is provided with a trip section 29 pivotally supported in the recess in such plate and adapted to be elevated through the medium of the spring operated pivot 30, the extent of elevation being limited by the bar 31 secured upon the trip plate, which bar is adjustable to vary the extent of elevation of the trip section 29. The trip plate 28 is supported at one end for sliding movement in a fixed plane relative to the casing 4 through the medium of a guide bar 32 arranged below and carried by that end of the casing 4 remote from the floor-board of the vehicle. The opposite end of the trip plate which extends beyond the forward end of the casing, operates through a bracket 33 secured in the opening in the inclined section 1 of the floor-board and provided with a cross bar 34 on which the trip plate rests and below which the accelerator rod is adapted to pass as clearly shown in Fig. 1.

Fig. 2 illustrates diagrammatically a circuit which includes conductors 35 and 36 leading from the respective terminals 18 to the signals 37, 38 and from the signals to the common conductor 39 to a battery 40, the latter being grounded at 41.

It is of course to be understood that the casing and cooperating parts are constructed of material forming the ground for the other side of the circuit. The respective signals 37, 38 may indicate left and right turns respectively, and the particular pull bars 22 may have designations, as "L" and "R" to correspond with these signals, so that through the operation of the appropriate pull bar the proper signal is energized.

Of course it is understood that three or more signals may be employed, in which event there would be three switch bars 6 and two partitions 4ª to support them, and the corresponding pull bars. This being a mere obvious enlargement, and the parts employed being mere duplicates of those described, illustration of such is not deemed necessary. Furthermore, as is quite common in signals of this type, appropriate signal casings may be employed at the front as well as the rear of the vehicle to simultaneously indicate to the oncoming and following vehicles the intention of the driver.

From the above description it will be apparent that the signals may be selectively operated by the manual manipulation of the preferred pull rod, thereby operating the corresponding switch bar 6 to close the signal circuit and energize the signal. The switch bars are locked in circuit closing position, and are automatically released in the movement of the accelerator bar which is employed to increase the speed of the vehicle after the operation indicated by the signal has been completed. This accelerator rod movement operates the trip plate and through the trip section 29 moves the locking members to release the switch bars, which latter are then returned to normal position by the spring 8.

What I claim as new is:

1. A switch for use in controlling a signal, comprising independent switch bars adapted in movement in one direction to close a signal controlling circuit, a spring for each switch bar for moving said switch bar to non-circuit closing position, each of said switch bars being formed with independent notches, a locking member cooperating with each switch bar and adapted to engage in one of the notches to hold the switch bar against movement under the influence of its spring while at the same time maintaining the switch bar in non-circuit closing position, means for manually moving the switch bar to circuit closing position, the locking means thereupon cooperating with the remaining notch in the bar to lock the bar in such position, and manually operable means to force the locking member out of the last named notch to permit the spring to move the switch bar to inoperative position.

2. A circuit closer for signal devices including a switch bar for closing the circuit and mounted for pivotal movement, means for moving the switch bar to close the circuit, a spring for normally holding the switch bar to maintain the circuit open, a locking member adapted for cooperation with two independent points on the switch bar to hold the switch bar either in position to maintain the circuit open or in position to maintain the circuit closed, an operating trip for the locking member, and means on the locking member to be projected in the path of the trip in one position of such member and to be held beyond the path of the trip in another position of such member.

3. A circuit closer for signal devices including a switch bar, a spring for operating the bar in one direction, manual means for operating the bar in the opposite direction, a locking member mounted for pivotal movement and including a bar adapted to cooperate with the switch bar in either of two positions as inaugurated by the spring or the manual means, a manually operable trip, and a foot-piece forming part of the locking member and adapted to be projected in the path of the trip in one position of the locking member and held beyond the path of the trip in the other position of such member.

4. A circuit closer for signal devices comprising a switch bar mounted for swinging movement to and from a circuit closing position, a spring serving to hold the bar in open circuiting position, manual means serving to move the bar into circuit closing position, a locking member pivotally supported adjacent the switch bar and including a bar section and a foot section, notches formed in one edge of the foot bar to receive the bar section of the locking member in the respective positions of the switch bar, and a manually operable trip, the locking member when in cooperation with one of the notches of the switch bar holding the foot section out of the path of the trip and arranging said foot section in the path of the trip when the locking member is in cooperation with the other notch of the switch bar.

In testimony whereof I affix my signature.

ALFRED E. PHILLIPS.